(12) United States Patent
Sercombe et al.

(10) Patent No.: US 6,823,928 B2
(45) Date of Patent: Nov. 30, 2004

(54) INFILTRATED ALUMINUM PREFORMS

(75) Inventors: Timothy Barry Sercombe, Brisbane (AU); Graham Barry Schaffer, Brisbane (AU)

(73) Assignee: University of Queensland, Queensland (AU)

(*) Notice: Subject to any disclaimer, the term of this patent is extended or adjusted under 35 U.S.C. 154(b) by 67 days.

(21) Appl. No.: 10/260,158

(22) Filed: Sep. 27, 2002

(65) Prior Publication Data

US 2004/0060683 A1 Apr. 1, 2004

(51) Int. Cl.[7] .............................................. B22D 19/00
(52) U.S. Cl. ........................ 164/97; 164/98; 164/101; 164/103; 164/111
(58) Field of Search ........................ 164/97, 98, 101, 164/103, 111

(56) References Cited

U.S. PATENT DOCUMENTS

| | | | |
|---|---|---|---|
| 4,828,008 A | | 5/1989 | White et al. |
| 4,863,538 A | | 9/1989 | Deckard |
| 5,020,584 A | | 6/1991 | Aghajanian et al. |
| 5,620,804 A | * | 4/1997 | Kennedy et al. ............ 428/609 |
| 5,745,834 A | * | 4/1998 | Bampton et al. ............. 419/37 |
| 6,416,850 B1 | | 7/2002 | Bredt et al. |
| 6,468,468 B1 | * | 10/2002 | Neubing et al. .............. 419/38 |
| 6,554,882 B1 | * | 4/2003 | Zhou et al. .................... 75/228 |

OTHER PUBLICATIONS

Lee, Kon Bae and Kwon, Hoon, "Fabrication and Characteristics of AA6061/$Si_3N_{4p}$ Composite by the Pressureless Infiltration Technique," *Metallurgical and Materials Transactions A*, vol. 30A, Nov. 1999, pp. 2999–3007.

Sercombe, T.B. and Schaffer, G.B., "Sintering Development for Free Formed Maraging Steel," *International Conference on Powder Mettalurgy and Particulate Materials*, Vancouver, Canada, Jul. 1999.

Lumley, R.N. and Schaffer, G.B., "The Effect of Solubility and Particle Size on Liquid Phase Sintering," *Scripta Materialia*, vol. 35, No. 5, 1996, pp. 589–595, Elsevier Science Ltd.

Lumley, R.N. and Schaffer, G.B., "The Effect of Additive Particle Size on the Mechanical Properties of Sintered Aluminum–Copper Alloys," *Scripta Materialia*, vol. 39, No. 8, 1998, pp. 1089–1094, Elsevier Science Ltd.

"Behavior of Magnesium Dissolved in the Surface of Aluminum Alloy Powders," *J. Japan Inst. Metals*, vol. 63, No. 9, 1999, pp. 1191–1196 (English abstract only).

"Behavior of Magnesium in the Surface of Aluminum Alloy Powders," *J. Japan Inst. Metals*, vol. 63, No. 9, 1999, pp. 1191–1196.

* cited by examiner

*Primary Examiner*—Kiley Stoner
*Assistant Examiner*—I.-H. Lin
(74) *Attorney, Agent, or Firm*—Greg Rosenblatt

(57) ABSTRACT

A method for the manufacture of a three-dimensional object includes the steps of forming a mixture that contains a binder and a least one of aluminum or a first aluminum-base alloy into a green composite, removing the binder from said green composite forming a porous preform structure and infiltrating the porous structure with a molten second aluminum base alloy to form the three-dimensional object with near theoretical density. The green composite may be formed by an additive process such as computer aided rapid prototyping, for example selective laser sintering. The method facilitates the rapid manufacture of aluminum components by an inexpensive technique that provides high dimensional stability and high density.

59 Claims, 3 Drawing Sheets

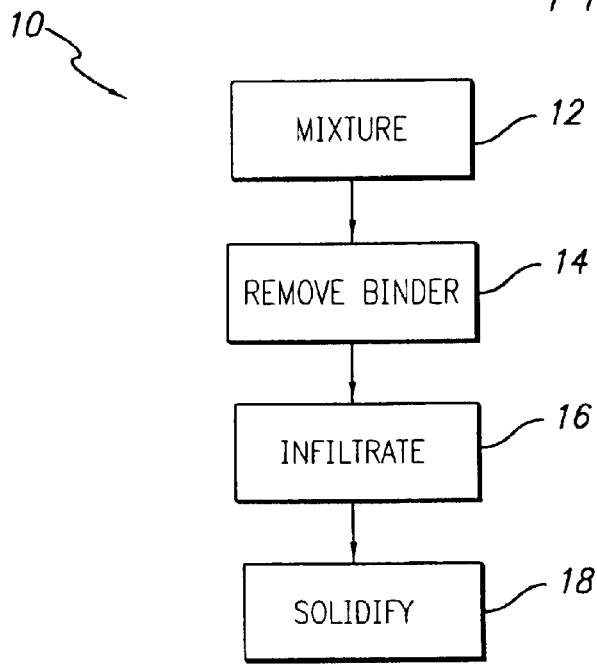
FIG. 1
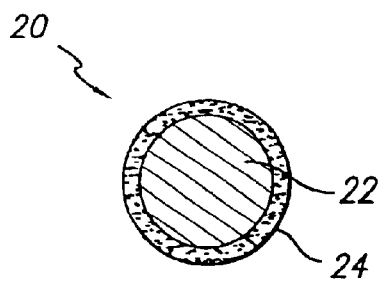
FIG. 2
FIG. 3
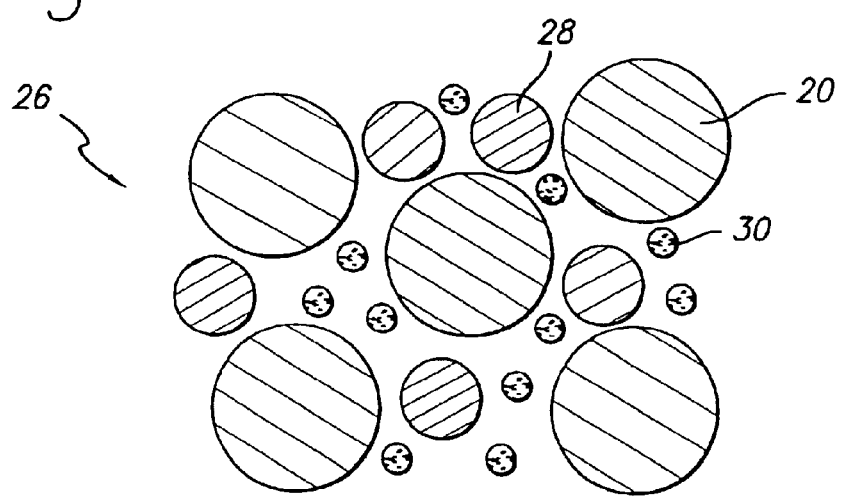

INFILTRATED ALUMINUM PREFORMS

CROSS REFERENCE TO RELATED APPLICATION(S)

Not Applicable

U.S. GOVERNMENT RIGHTS

Not Applicable

BACKGROUND OF THE INVENTION

1. Field of the Invention

This invention relates generally to a method for the rapid manufacture of aluminum alloy components and can have specific application to limited production runs, such as those encountered in rapid prototyping or rapid manufacturing. More particularly it relates to a method whereby a porous aluminum or aluminum alloy preform is formed into a desired shape and supported by a polymeric binder. A second, lower melting temperature, aluminum alloy is caused to infiltrate the porous preform forming a dense structurally sound component.

2. Description of the Related Art

Aluminum and aluminum alloy components are traditionally fabricated by casting, mechanical working or machining, as well as combinations of these processes. When casting, molten metal fills a mould having an internal cavity formed into the shape of a desired component. After the molten metal cools and solidifies, the component is removed from the mould in either net shape (finished form) or near net shape (close to finished form, but requiring some additional working or machining). When mechanical working, such as forging, drawing, rolling, extrusion or stamping, a cast billet of the metal is mechanically deformed into the shape of the desired component. Casting requires moulds machined to the shape of the desired component while tools used to apply mechanical deformation require dies formed to the required shape. While both casting and mechanical working are well suited for the economical manufacture of large quantities of identically shaped components, neither is particularly suitable for specialty applications or prototypes where only a few components are required or where various aspects of the shape are to be varied from component to component.

Aluminum and aluminum alloy components can also be machined from stock material that may have been mechanically worked or cast. Machining is time consuming, has a very poor utilization of raw material and requires skilled operators. Machined components are therefore expensive and slow to produce.

Aluminum powders can also be used to fabricate parts, either to take advantage of a unique property set or because net shape parts can be inexpensively fabricated. In the former case, the powders are typically consolidated by extrusion, forging or hot isostatic pressing. Net shape parts are made by pressing aluminum powder at extremely high pressures (nominally in excess of 30,000 pounds per square inch) into hard tooling cavities to achieve green densities as high as 95%. After pressing, the part is ejected from the die and the so-called green body is sintered in a furnace at elevated temperatures under a controlled atmosphere, commonly nitrogen. Aluminum, and aluminum alloys, have a propensity to form a highly stable alumina ($Al_2O_3$) surface film that passivates the individual powder particles limiting further oxidation. The surface oxide also hinders the diffusional mechanisms needed to sinter aluminum powder preforms into fully dense aluminum components. As a solution to this challenge, the aluminum powder industry has developed blends of aluminum powder, surface oxide reducing agents, lubricants and sintering agents. All of these technologies require tooling or dies which are used to shape the part. This tooling is expensive and is time consuming to produce. This delays the time needed to introduce new products and increases their cost.

An alternative production strategy produces three-dimensional objects directly from the manipulation of data from computer aided design (CAD) databases. Various technologies are known to produce such parts, particularly through the use of additive processes as opposed to subtractive processes such as conventional machining. Important additive processes for the production of such parts include stereolithography, selective laser sintering, laminated object manufacturing, three-dimensional printing and fused deposition modeling. A common feature of all of these rapid prototyping and rapid manufacturing techniques is that energy and/or material is delivered to a point to produce a solid. A series of lines are then traced out to make a cross-sectional layer and a series of layers formed to make a three dimensional part. In principle, there are as many such potential manufacturing systems as there are ways to write or draw on a surface. Producing components in this way has a number of important advantages over traditional manufacturing processes. Most importantly, parts of any shape can be produced directly from a CAD model without the need for expensive tooling or machining and these can be produced in a small fraction of the time that is typically required of traditional manufacturing operations.

Selective laser sintering is described in more detail in U.S. Pat. No. 4,863,538 to Deckard and three-dimensional printing is described in more detail in U.S. Pat. No. 6,416,850 to Bredt, et al. Both the U.S. Pat. No. 4,863,538 and the U.S. Pat. No. 6,416,850 are incorporated by reference in their entireties herein. These techniques have been used to fabricate objects made from a variety of materials such as photoset resins, other polymers such as nylon and ethylene butadiene styrene, organic waxes, ceramics such as SiN, and metals, most commonly steel.

Recently, aluminum parts have been produced by selective laser sintering and extrusion freeform fabrication. These aluminum parts were fabricated as polymer/aluminum powder composites and post-processed by burning out the polymer and then sintering the remnant metal powder to full or near-full density, in a manner similar to that used in powder injection molding. However, it is extremely difficult to maintain dimensional accuracy during sintering of such a powder preform because of density gradients in the green part and geometrical constraints. While uniform shrinkage can be incorporated into the initial CAD design, non-uniform shrinkage, or distortion, is more difficult to control reproducibly and to accommodate by design. Because dimensional accuracy is a critical criterion for any rapid prototyping/rapid manufacturing system, the inability to accurately sinter large parts is fatal. Only small aluminum parts can presently be made this way: the limit is approximately 1 $cm^3$.

U.S. Pat. No. 4,828,008 discloses that a permeable ceramic mass is spontaneously infiltrated by a molten aluminum alloy containing at least 1%, by weight, of magnesium and optionally also containing silicon. "Spontaneous infiltration" means that the molten metal infiltrates the permeable mass without the requirement for the application of pressure or vacuum (whether externally applied or internally created). U.S. Pat. No. 4,828,008 is incorporated by reference in its entirety herein.

The dimensional accuracy of a component formed is much improved by infiltration, whether spontaneous, pressure-assisted or vacuum-assisted. The loosely formed powder body is lightly pre-sintered and the porous mass is subsequently infiltrated by a liquid metal at a temperature between the melting point of the infiltrant and the base metal. Because there is so little sintering, there is negligible dimensional change between the preform and the finished part. Numerous systems have been fabricated by the rapid prototyping/rapid manufacturing/infiltration route to date, including Fe—Cu, stainless steel-bronze, $ZrB_2$—Cu and SiC—Mg. Aluminum and aluminum base alloys are a conspicuous omission from the successful metallic infiltration systems. It is theorized that the alumina surface film on the aluminum and aluminum alloy particles may have prevented the infiltration of porous aluminum components.

There remains, firstly, a need for a method to spontaneously infiltrate a porous mass of a first aluminum-base material with a molten second aluminum-base material. In addition, there remains a need for an additive process to manufacture aluminum alloy parts that does not have the above-stated deficiencies. The additive process should result in parts with a density close to the theoretical density of the aluminum alloy and be capable of a high level of dimensional accuracy.

BRIEF SUMMARY OF THE INVENTION

In accordance with a first embodiment of the invention, there is provided a method for the spontaneous infiltration of a porous aluminum-base preform. This method includes the steps of forming a mixture that contains a binder and at least one of aluminum or a first aluminum-base alloy into a green composite, removing the binder from the green composite forming a porous preform structure, infiltrating the porous preform structure with a molten second aluminum base alloy, to form the three-dimensional object with near theoretical density.

In accordance with a second embodiment of the invention, there is provided a method for the manufacture of a three-dimensional object that includes the steps of forming a mixture that contains a binder and a least one of aluminum or a first aluminum-base alloy into a green composite, removing the binder from said green composite forming a porous preform structure, infiltrating the porous preform structure with a molten second aluminum base alloy, to form the three-dimensional object with near theoretical density. The green composite may be formed by an additive process such as computer aided rapid prototyping, for example selective laser sintering or a casting or molding process such as a room temperature vulcanization process like the Keltool® process, metal injection molding, extrusion molding, resin transfer molding, rotational molding, or pressing. The method facilitates the manufacture of aluminum components by an inexpensive technique useful in rapid manufacturing or rapid prototyping that provides high dimensional stability and high density.

For either the first embodiment or the second embodiment, an aluminum nitride skeleton may be formed on the surfaces of the aluminum particles or the particles of a first aluminum-base alloy powder for increased preform strength and dimensional stability.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

FIG. 1 shows in flow chart representation a process for the infiltration of a porous aluminum-base preform by a molten aluminum-base alloy.

FIG. 2. shows in cross-sectional representation an aluminum alloy particle used to form the porous mass in accordance with an embodiment of the invention.

FIG. 3 shows in cross-sectional representation a blend of powders in accordance with an embodiment of the invention.

Like reference numbers and designations in the various drawings indicated like elements.

DETAILED DESCRIPTION

Figure 4:
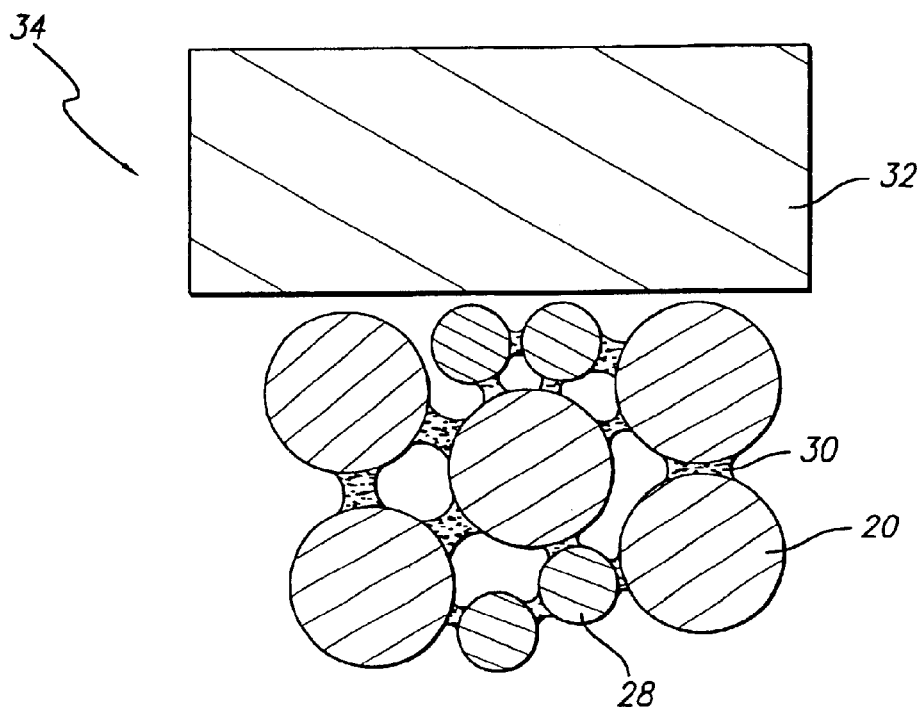
FIG. 4 shows in cross-sectional representation the effect of initial heating on the blend of powders shown in FIG. 3.

FIG. 1 shows in flow chart representation a sequence of process steps 10 in accordance with a first embodiment of the invention. In a first step 12, a mixture containing a binder and at least one of aluminum or a first aluminum-base alloy is formed into a green composite. As used herein, "aluminum-base" means that the alloy contains at least 50%, by weight, of aluminum.

Preferably the mixture comprises a minimum of three powders blended together. One powder is an aluminum alloy, such as aluminum alloy 6061, that constitutes approximately about 80 to about 95%, by volume, and more preferably from about 85% to about 90%, by volume, of the total mixture. This base metal may be any aluminum-base alloy powder or pure aluminum.

The aluminum or first aluminum-base alloy is in powder form of any effective particle size. Preferably the average particle size is between about 5 and about 150 microns (1 micron=1 $\mu$m=1×10$^{-6}$ meter) and more preferably, the average particle size of the metallic powder is in the range of from about 10 to about 75 microns. One preferred aluminum alloy is aluminum alloy 6061 that has a nominal composition, by weight, of about 0.4% to about 0.8% silicon, about 0.15% to about 0.40% copper, about 0.8% to about 1.2% magnesium, about 0.04% to about 0.35% chromium and the balance aluminum and unavoidable impurities.

As a non-limiting list, the aluminum may be alloyed with one or more of the following elements copper, magnesium, silicon, zinc, titanium, chromium, zirconium, nickel, iron, manganese and silver.

A second powder component of the mixture constitutes approximately about 0.1 to about 4%, by weight, and preferably from about 1.5% to about 2.5%, by weight of the total mixture. This second powder includes an oxygen-scavenger, such as magnesium that cleans the atmosphere surrounding the mixture and reduces the oxide layer on the aluminum-base metal particles. The oxygen scavenger is in particle form with an average particle size of between about 5 and about 150 microns and preferably the average particle size is between about 10 and about 75 microns. Other suitable oxygen scavengers include zirconium, lithium, beryllium, calcium, cerium, lanthanum, neodynium, praesodinium, samarium, thorium, uranium, or misch metal.

As disclosed hereinbelow, while there are benefits to including the oxygen scavenger in the powder mixture, effective infiltration is also obtained if the oxygen scavenger is included in a support layer formed about the green composite, in which case the oxygen scavenger may be omitted from the powder mixture.

A third powder component of the mixture, which constitutes about 5% to about 15%, by volume, and preferably about 8% to about 12%, by volume, of the total blend, includes a binder. The binder may be a metallic binder such as zinc stearate, an organic or an inorganic binder, but preferably is an organic polymeric binder. Organic polymeric binders can include thermoplastics with sharp melting points such as nylon 6, nylon 11, nylon 12, copolymers of nylon 12 and nylon 6, polyacetals, polyethylene, polyethylene copolymers, polymethacrylates, polypropylene, and polyether block amides. The average particle size of the polymer binder powder is generally in the range of about 1 to about 50 µm. The binder is selected to be a material that decomposes to a gas with a minimum of carbon residue when heated to a temperature of between about 300° C. and about 500° C. in a suitable atmosphere, such as nitrogen. Where nitrogen is used to create the atmosphere, the nitrogen source can be pure nitrogen, a mixture of gases including nitrogen, any nitrogen rich binder material that evolves nitrogen to form a nitride skeleton, metal nitrides such as transition metal nitrides or magnesium nitride.

The green composite is heated relatively slowly, such as about 1 to about 2° C. per minute to facilitate binder vapor outgassing from the green composite by way of open, connected, porosity without a build up of localized pockets of vapor pressure that could damage the part. Preferred binders have a relatively low melt flow viscosity (on the order of 25 to 145 grams per 10 minutes) and substantially complete decomposition to nitrogen, nitrogen compounds and other gases when heated to a temperature in the 300°–500° C. range. Suitable binders include the aforementioned nylons, and more specifically Orgasol® 2001 Nylon-12 (gram molecular weight of 17,400, melt flow viscosity of about 25 to about 100 grams per 10 minutes and decomposition temperature of about 433 to about 481° C.), Orgasol® 3501EXD (gram molecular weight of 6,500, melt flow viscosity of about 25 to about 100 grams per 10 minutes and decomposition temperature of about 414 to about 472° C.) and Orgasol® 3501UD (melt flow viscosity of about 25 to about 100 grams per 10 minutes and decomposition temperature of about 425 to about 472° C.). All of these aforementioned Orgasol® nylon binders are available commercially from Atofina SA, of 4–8, cours Michelet-La Défense 10-F-92800 Puteaux-France.

Other powder constituents which may be added to the mixture include a wetting agent such as but not limited to tin, lead, bismuth, antimony, indium or cadmium.

A homogeneous green composite of the powders having a desired shape is formed either by deposition in a mould or by using any rapid prototyping technique, such as those described above. A resin bonded preform is formed by exposing the green composite to a suitable cure initiator, such as heat or ultra-violet light. This resin bonded preform has a density of approximately about 50% to about 70% of the theoretical density for the aluminum alloy and structurally has an interconnecting network of pores extending through the preform.

The binder is next removed, as illustrated in FIG. 1 by numeral 14, such as by thermal decomposition, by heating to a temperature in the range of from about 300° C. to about 500° C. with a sufficiently low heat up rate to avoid the formation of high pressure vapor pockets. Removal of the polymer binder will temporarily reduce the integral strength of the part. To provide support, a support powder that will not bond to the part under the processing conditions surrounds the preform. Suitable support powders include ceramics, such as alumina, silicon carbide and boron nitride, mixed with an oxygen scavenger, such as magnesium. As noted above, inclusion of an oxygen scavenger in the support powder may be sufficiently effective to remove the need to include an oxygen scavenger in the mixture of powders forming the green composite.

The oxygen scavenger is present in an amount of from about 0.1% to about 10%, by volume, of the support powder, and more preferably, is present in an amount of from about 0.5% to about 5%, by volume. Other metal powders that may be mixed with the ceramic support powder are titanium, zirconium, lithium, beryllium, calcium, cerium, lanthanum, neodynium, praesodinium, samarium, thorium, uranium, or misch metal and mixtures thereof, either in combination with magnesium or as a substitute for the magnesium.

Once the binder has been removed, the temperature is increased to a temperature, effective to promote the formation of aluminum nitride at low oxygen partial pressures, but not high enough to melt the infiltrant. An aluminum nitride skeleton 36, seen in FIGS. 5 and 6, forms on the surface of the aluminum-base alloy powders. The aluminum nitride skeleton 36 is rigid and significantly increases the strength of the composite. However, because the skeleton is also rigid, an excessively thick skeleton is not desirable due to the resultant decreased ductility. As a result, polymer binders having lower processing temperatures are preferred for enhanced ductility. One suitable thermal profile is about 2 hours at about 540° C. in a nitrogen atmosphere. Since the rigid skeleton provides dimensional stability, it should not be attacked by the liquid infiltrant.

Alloying additions also affect the growth of the nitride skeleton. The nitride formation rate is highest for pure aluminum and lower for aluminum containing additions of silicon and magnesium, referred to as aluminum alloys of the 6xxx series, where x is between 0 and 9. Additions of magnesium absent an inclusion of silicon, referred to as aluminum alloys of the 5xxx series, do not appear to significantly inhibit the nitride formation rate.

In addition to aluminum alloy 6061, the following aluminum alloys have been shown to reduce the rate of nitride formation and are examples of the preferred first aluminum-base alloy: 6063, nominal composition by weight, Al-0.7% Mg-0.4% Si; 6082, nominal composition by weight Al-0.9% Mg-1.0% Si-0.7% Mn; 6106, nominal composition by weight Al-0.6% Mg-0.45% Si-0.25% Cu and 6351 nominal composition by weight Al-0.6% Mg-1.0% Si-0.6% Mn.

The infiltrant must melt at a temperature higher than that required for skeleton formation. The infiltrant must melt at a temperature below the melting temperature of the powder mixture. In addition, the infiltrant must have sufficient fluidity and a sufficiently low viscosity to flow through the interconnected pores of the composite. In addition, the contact angle between a bead of the infiltrant and the skeleton must be sufficiently low to support good wettability. A contact angle of greater than 90° is typically viewed as non-wetting while a contact angle of less than 90° is viewed as wetting; the closer to 0° contact angle, the more effective the infiltration. Further considerations are the solubility of the aluminum alloy powder in the liquid infiltrant and the phase diagram of the combination of aluminum alloy powder and infiltrant. A large number of phases or a number of transient phases is not desirable, since that could lead to inhomogeneity in the solidified composite.

Suitable alloys for the infiltrant are eutectic or near eutectic aluminum based alloys. By near eutectic it is meant within about 5% of the eutectic, for example the binary aluminum copper eutectic is about 33%, by weight, copper, the near eutectic is about 28% to about 33% copper. The infiltrant may be an aluminum based alloy further containing one or more of the following: copper, magnesium, silicon, zinc, titanium, zirconium, iron, silver, lead, tin, bismuth, antimony, strontium, sodium and nickel. In addition to aluminum-base alloys, aluminum with up to about 53% by weight copper alloy is also acceptable.

As a non-exclusive list, the following alloys are useful as the infiltrant. All compositions are specified in weight percent. Each composition may contain other, unspecified elements in amount that does not materially affect the infiltration properties described above.

| | |
|---|---|
| Silicon | 8%–18% |
| Magnesium | 3%–7% |
| Aluminum | balance. |
| Nominal (Al—13.8% Si—4.7% Mg) melting temperature of 557° C. | |
| Copper | 28%–38% |
| Aluminum | balance. |
| Nominal (Al—33% Cu) melting temperature of 548.2° C. | |
| Silicon | 8%–12% |
| Zinc | 8%–12% |
| Nickel | 3%–8% |
| Aluminum | balance. |
| Nominal (Al—10.5% Si—10% Zn—5.5% Ni) melting temperature of 549° C. | |
| Silicon | 8%–18% |
| Aluminum | balance. |
| Nominal (Al—12% Si) melting temperature of 577 ± 1° C. | |

Once at the infiltration temperature, generally about 10° C. above the melting temperature of the infiltrant, the part is held at temperature for a time effective for complete infiltration, as illustrated in FIG. 1 by numeral 16, of molten infiltrant into the preform, on the order of about 1 to about 15 hours, and preferably from about 2 hours to about 10 hours. At which time the part is cooled, typically at a rate of from about 1° C. per minute to about 5° C. per minute, and nominally 2° C./minute, to solidify, as illustrated in FIG. 1 by numeral 18.

Following solidification, the strength of the part may be increased by heat treating the infiltrated part. One suitable heat treatment is to heat to from about 500° C. to about 550° C. for from about 1 to about 24 hours followed by a water quench. Additional strength is achieved through age hardening, either at room temperature (natural aging) or at elevated temperatures, typically at about 100° C. to about 200° C., for a time effective to promote full hardening.

Other post-solidification treatments may include hot isostatic pressing to close residual porosity and polishing or sand blasting to provide a smooth finish to the part.

The mechanism by which the Applicants successfully spontaneously infiltrated an aluminum alloy with a different aluminum alloy is believed to be the following. This represents Applicants best understanding of the process as of the filing of the patent application. With reference to FIG. 2, a particle of aluminum alloy powder 20 has a metallic core 22, such as, by weight, nominally Al-1% Mg-0.6% Si-0.25% Cu-0.25% for aluminum alloy 6061. Surrounding the core 22 is a thin, chemically and thermally stable, alumina film 24. With reference to FIG. 3, a blended mixture of powders 26 is formed. The mixture 26 includes aluminum or aluminum alloy particles 20 (the alumina film is present, but sufficiently thin not to be illustrated in FIG. 3), oxygen scavenger particles 28, such as magnesium, and a polymer binder 30, such as nylon-12. As nominal quantities, there is about 2%, by weight, of the oxygen scavenger and about 10% by volume of the binder with the balance aluminum alloy particles.

With reference to FIG. 4, the blend of powders of FIG. 3 is formed into a desired near net shape, such as by rapid prototyping and optionally surrounded by a support layer, such as a mixture of alumina and magnesium powders (not shown). A desired infiltrant 32, such as, by weight, nominally Al-13.8% Si-4.7% Mg, is placed in contact with the blend of powders. The assembly 34 is then heated in an inert atmosphere, preferably nitrogen containing and more preferably, substantially only nitrogen to a temperature effective to melt the polymer binder 30, without melting any of the metallic components (aluminum alloy powder 20, oxygen scavenger 28 and infiltrant 32). For a nylon-12 binder, this temperature is in the range from about 150° C. to about 300° C.

Figure 5:
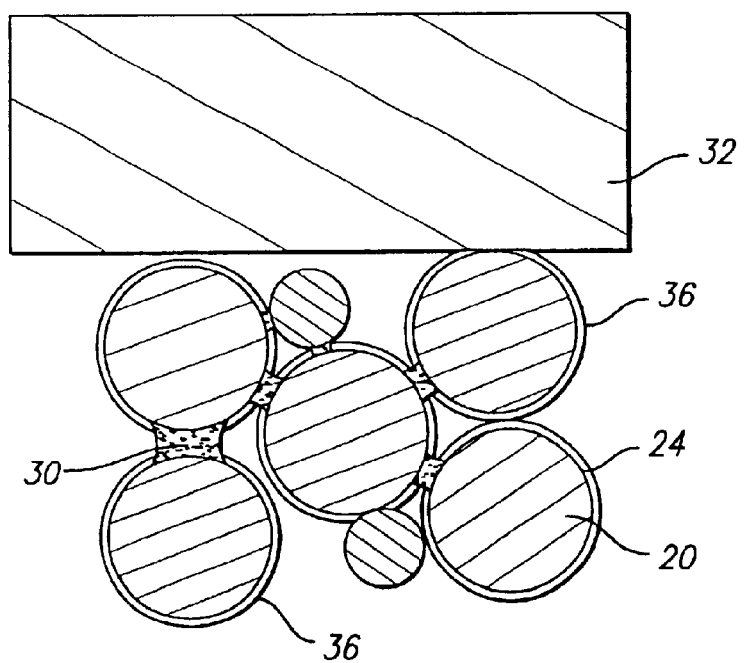
FIG. 5 shows in cross-sectional representation the effect of further heating on the blend of powders shown in FIG. 3.

With reference to FIG. 5, as the blend of powders of FIG. 3 is further heated, such as through the temperature range of from about 300° C. to about 540° C. in nitrogen, the polymer binder 30 begins to decompose. If the polymer binder 30 is nylon-12, the binder decomposes to a carbonaceous residue, $\epsilon$-Caprolactam ($C_6H_{11}NO$) and gaseous fixed nitrogen species such as HCN, $N_2O$ and $NH_3$. Gaseous carbon species such as CO and $CO_2$ are also formed.

While the assembly may be moved to different ovens to achieve the desired thermal exposures, it is preferred that the assembly remain in a single atmosphere controlled oven programmed with temperatures and time periods sufficient to perform each process step in series.

Figure 6:
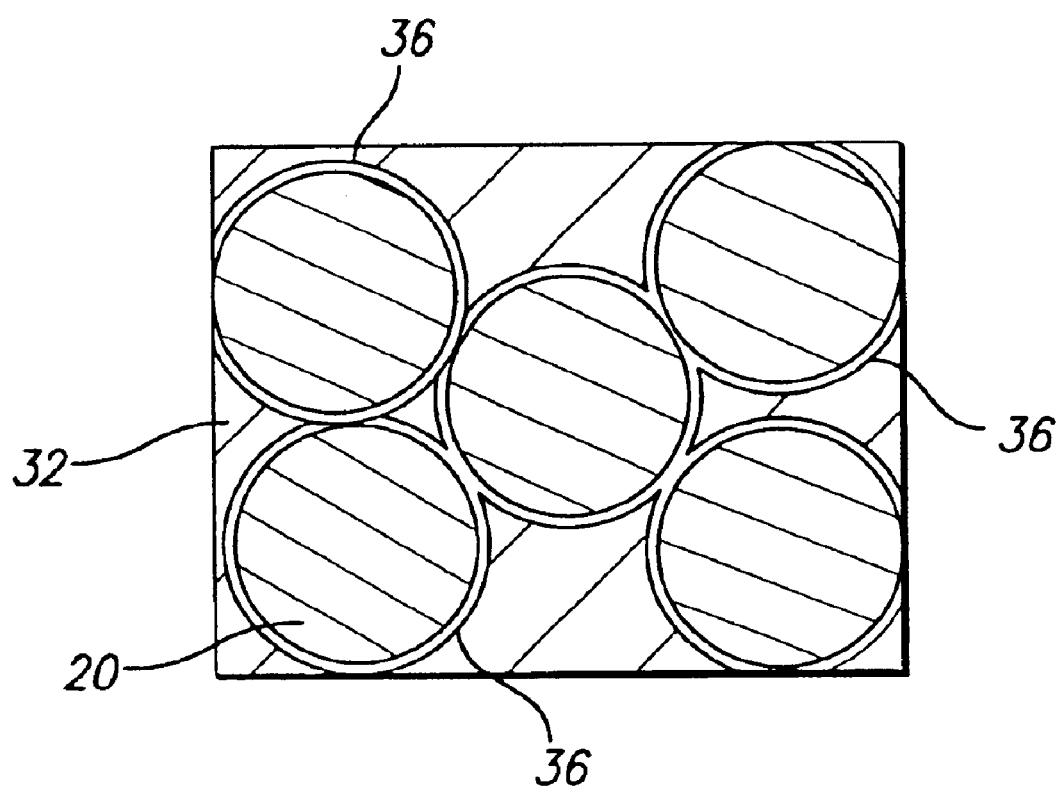
FIG. 6 shows in cross-sectional representation the effect of still further heating on the blend of powders shown in FIG. 3.

With reference to FIG. 5, after the removal of the binder, the part is held at a temperature between the temperatures at which the aluminum nitride compound forms and the temperature at which infiltration occurs. By applying an isothermal hold in this temperature band, and providing the oxygen content is sufficiently low, partial conversion of the aluminum to an aluminum nitride compound occurs. Growth of the aluminum nitride compound results in the formation of a rigid skeleton 36. The hold time should be such as to allow sufficient but not excessive formation of this skeleton 36. Typically, a hold time of about 2 hours at about 540° C. is used. Once skeleton 36 has formed, the temperature is increased to above that at which the infiltrant becomes molten to allow spontaneous or pressureless infiltration of the part. The part is held at the infiltration temperature sufficiently long to ensure full penetration of the liquid, typically about 2 to about 4 hours, as illustrated in FIG. 6.

The above invention will become more apparent from the Examples that follow.

EXAMPLES

Example 1

A green composite was made by selective laser sintering of a powder mixture containing 6061 powder, 2 wt % Mg and 10 vol % nylon binder using each of the nylon binders previously recited as being commercially available from Atofina S.A. An infiltrant with a composition, by weight, of Al-13.8Si-4.9Mg was placed in contact with the preform. The amount of the infiltrant was sufficient to just fill the pore volume. The assembly was then placed inside a crucible and covered with a support powder consisting of alumina containing 1 vol % Mg powder. The crucible was then placed inside a nitrogen-atmosphere furnace and heated at approximately 90° C. per hour to a temperature of 540° C. and held for a period of 2 hours to allow the skeleton to form. The furnace temperature was then increased at the same rate to 570° C. and held for 4 hours to allow spontaneous infiltration of the whole preform. The parts were then furnace cooled until the temperature was below 200° C. and then removed from the furnace and air-cooled. The parts were removed from the support powder and sand blasted. The density of each part was close to the theoretical density for the aluminum-base alloy.

Similarly successful infiltrations were obtained by the processes recited in Examples 2 through 7 that follow.

Example 2

An alloy was made and processed as per Example 1 but with an infiltrant composition of Al-33 wt % Cu.

Example 3

An alloy was made and processed as per Example 1, but with an infiltrant composition of Al-10.5Si-10Zn-5.5Ni.

Example 4

An alloy was made and processed as per Example 1, but with an infiltrant composition of Al-12Si and an infiltration temperature of 590° C.

Example 5

An alloy was made and processed as per Example 1, but the initial powder mixture consisted of 6061 powder and 10 vol % nylon binder.

Example 6

An alloy was made and processed as per Example 1, but the initial powder mixture consisted of aluminum powder, 2 wt % Mg and 10 vol % nylon binder.

Example 7

A green body consisting of a powder mixture containing 6061 powder, 2 wt % Mg and 10 vol % nylon binder using each of the nylon binders previously recited as being commercially available from Atofina S.A. was made by placing the powder mixture in a mould and heating this to a temperature above the melting point of the nylon. On cooling, the resin-body green body was extracted from the mould and processed as per Example 1.

It should be noted that the present process is applicable to other materials and compositions, and one skilled in the art will understand that the alloys, blend percentages, particle sizes, and temperatures described herein are presented as examples and not limitations of the present invention.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for the manufacture of a three-dimensional object, comprising the steps of: a) forming a mixture that contains a binder and at least one of aluminum or a first aluminum-base alloy into a green composite; b) removing said binder from said green composite and forming a porous preform structure that is supported by a rigid aluminum nitride skeleton; and c) infiltrating said porous preform structure with an infiltrant that is a molten second aluminum base alloy to form said three-dimensional object with near theoretical density.

2. The method of claim 1 wherein said first aluminum base alloy is selected to be an alloy with copper, magnesium, silicon, zinc, titanium, chromium, zirconium, nickel, iron, manganese, silver, and mixtures thereof.

3. The method of claim 2 wherein said first aluminum base alloy is alloyed with silicon.

4. The method of claim 3 wherein said first aluminum base alloy is alloyed with a combination of silicon and magnesium.

5. The method of claim 4 wherein said first aluminum base alloy is selected to be, by weight, about 0.4% to about 0.8% silicon, about 0.15% to about 0.40% copper, about 0.8% to about 1.2% magnesium, about 0.04% to about 0.35% chromium and the balance is aluminum and unavoidable impurities.

6. The method of claim 2 wherein said binder is selected to be a polymer that substantially decomposes to gases at a temperature of between about 300° C. and about 500° C. in a nitrogen-base atmosphere.

7. The method of claim 6 wherein said binder is selected to be a nylon.

8. The method of claim 2 including an addition of an oxygen scavenger to said mixture.

9. The method of claim 8 wherein said oxygen scavenger is selected to be magnesium.

10. The method of claim 1 wherein said infiltrant is selected to be a eutectic or near eutectic of aluminum with copper, magnesium, silicon, zinc, titanium, zirconium, iron, silver, lead, tin, bismuth, antimony, strontium, sodium, nickel and mixtures thereof.

11. The method of claim 10 wherein said infiltrant is selected to include silicon and magnesium.

12. The method of claim 11 wherein said infiltrant is selected to have a nominal composition, by weight, of 13.8% silicon, 4.7% magnesium and the balance is aluminium and inevitable impurities.

13. The method of claim 11 wherein said infiltrant is selected to have a nominal composition, by weight, of less than about 53% copper and the balance is aluminium and inevitable impurities.

14. The method of claim 1 wherein step (b) is at a temperature of between about 300° C. about 500° C., step (c) is at a temperature of from about 540° C. to a temperature in excess of about 540° C., but less than the melting or solidus temperature of the first aluminium alloy.

15. The method of claim 14 wherein steps (b)–(c) are in a single oven programmed with temperatures and times effective for each step and said steps are performed in a nitrogen-base atmosphere.

16. The method of claim 14 wherein prior to step (b), said porous preform structure is surrounded with a porous support structure, said porous support structure selected to include both a ceramic and an oxygen scavenger.

17. The method of claim 16 in which said oxygen scavenger is selected to be magnesium.

18. A method for the manufacture of a three-dimensional object having a desired shape, comprising the steps of: a) forming a mixture that contains a binder and at least one of aluminum or a first aluminum-base alloy into a green composite having said desired shape; b) removing said binder from said green composite by a process effective to maintain said desired shape as a porous preform structure; c) converting a portion of said aluminum to form an aluminum nitride skeleton thereby transforming said green composite to a rigid skeleton of said desired shape with said porous preform structure; and d) infiltrating said porous preform structure with an infiltrant that is a molten second aluminum-base alloy; to form said three-dimensional object with a near theoretical density.

19. The method of claim 18 wherein said first aluminum base alloy is selected to be an alloy with copper, magnesium, silicon, zinc, titanium, chromium, zirconium, nickel, iron, manganese, silver, and mixtures thereof.

20. The method of claim 19 wherein said first aluminum base alloy is alloyed with silicon and magnesium.

21. The method of claim 18 wherein said binder is selected to be a polymer that substantially decomposes to gases at a temperature of between about 300° C. and about 500° C. in a nitrogen-base atmosphere.

22. The method of claim 21 wherein said binder is selected to be a nylon.

23. The method of claim 18 including an addition of an oxygen scavenger to said mixture.

24. The method of claim 23 wherein said oxygen scavenger is selected to be magnesium.

25. The method of claim 23 including the step of forming a nitride skeleton within said porous preform structure by exposure to nitrogen at low oxygen partial pressure.

26. The method of claim 18 wherein said infiltrant is selected to be a eutectic or near eutectic of aluminum with copper, magnesium, silicon, zinc, titanium, zirconium, iron, silver, lead, tin, bismuth, antimony, strontium, sodium, nickel and mixtures thereof.

27. The method of claim 26 wherein said infiltrant is selected to include silicon and magnesium.

28. The method of claim 27 wherein said infiltrant is selected to have a nominal composition, by weight, of 13.8% silicon, 4.7% magnesium and the balance is aluminum and inevitable impurities.

29. The method of claim 27 wherein said infiltrant is selected to have a nominal composition, by weight, of less than about 53% copper and the balance is aluminum and inevitable impurities.

30. The method of claim 18 wherein step (b) is at a temperature of between about 300° C. and about 500° C., step (c) is at a temperature of from about 500° C. to about 570° C. and step (d) is at a temperature of from about 540° C. to a temperature in excess of about 540° C., but less than the melting or solidus temperature of the first aluminum alloy.

31. The method of claim 30 wherein steps (b)–(d) are in a single oven programmed with temperatures and times effective for each step and said steps are performed in a nitrogen-base atmosphere.

32. The method of claim 30 wherein prior to step (b), said porous preform is surrounded with a porous support structure, said porous support structure selected to include both a ceramic and an oxygen scavenger.

33. The method of claim 32 in which said oxygen scavenger is selected to be magnesium.

34. The method of claim 30 wherein said desired shape is formed by computer aided rapid prototyping.

35. The method of claim 34 wherein said desired shape is formed by selective laser sintering.

36. The method of claim 18 wherein subsequent to step (d), said three dimensional object is further densified by hot isostatic pressing.

37. The method of claim 18 wherein subsequent to step (d), said three dimension object is smooth finished.

38. The method of claim 18 wherein subsequent to step (d), said three dimension object is heat treated.

39. A method for the manufacture of a three-dimensional object, comprising the steps of: a) forming a mixture that contains a binder and at least one of aluminum or a first aluminum-base alloy into a green composite; b) removing said binder from said green composite forming a porous preform structure; c) transforming a portion of the aluminum and/or first aluminum base alloy into an aluminum nitride compound by reaction with a nitrogen source to form a rigid aluminum nitride skeleton; and d) infiltrating said porous preform structure with an infiltrant that is a molten second aluminum base alloy to form said three-dimensional object with near theoretical density.

40. The method of claim 39 wherein said first aluminum base alloy is selected to be an alloy with copper, magnesium, silicon, zinc, titanium, chromium, zirconium, nickel, iron, manganese, silver, and mixtures thereof.

41. The method of claim 40 wherein said first aluminum base alloy is alloyed with silicon and magnesium.

42. The method of claim 39 wherein said binder is selected to be a polymer that substantially decomposes to gases at a temperature of between about 300° C. and about 500° C. in a nitrogen-base atmosphere.

43. The method of claim 42 wherein said binder is selected to be a nylon.

44. The method of claim 39 including an addition of an oxygen scavenger to said mixture.

45. The method of claim 44 wherein said oxygen scavenger is selected to be magnesium.

46. The method of claim 44 including the step of forming a nitride skeleton within said porous preform by exposure to nitrogen at low oxygen partial pressure.

47. The method of claim 39 wherein said infiltrant is selected to be a eutectic or near eutectic of aluminum with copper, magnesium, silicon, zinc, titanium, zirconium, iron, silver, lead, tin, bismuth, antimony, strontium, sodium, nickel and mixtures thereof.

48. The method of claim 47 wherein said infiltrant is selected to include silicon and magnesium.

49. The method of claim 48 wherein said infiltrant is selected to have a nominal composition, by weight, of 13.8% silicon, 4.7% magnesium and the balance is aluminum and inevitable impurities.

50. The method of claim 48 wherein said infiltrant is selected to have a nominal composition, by weight, of less than about 53% copper and the balance is aluminum and inevitable impurities.

51. The method of claim 39 wherein step (b) is at a temperature of between about 300° C. and about 500° C., step (c) is at a temperature of from about 500° C. to about 570° C. and step (d) at a temperature of from about 540° C. to a temperature in excess of about 540° C., but less than the melting or solidus temperature of the first aluminum alloy.

52. The method of claim 51 wherein steps (b)–(d) are in a single oven programmed with temperatures and times effective for each step and said steps are performed in a nitrogen-base atmosphere.

53. The method of claim 51 wherein prior to step (b), said porous preform structure is surrounded with a porous support structure, said porous support structure selected to include both a ceramic and an oxygen scavenger.

54. The method of claim 53 in which said oxygen scavenger is selected to be magnesium.

55. The method of claim 39 wherein said desired shape is formed by computer aided rapid prototyping.

56. The method of claim 55 wherein said desired shape is formed by selective laser sintering.

57. The method of claim 39 wherein subsequent to step (d), said three dimensional object is further densified by hot isostatic pressing.

58. The method of claim 39 wherein subsequent to step (d), said three dimensional object is smooth finished.

59. The method of claim 39 wherein subsequent to step (d), said three dimensional object is heat treated.

* * * * *